United States Patent
Kim (10) Patent No.: US 12,485,752 B2
(45) Date of Patent: Dec. 2, 2025

(54) VEHICLE LIGHTING APPARATUS

(71) Applicant: HYUNDAI MOBIS CO., LTD., Seoul (KR)

(72) Inventor: Won Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 162 days.

(21) Appl. No.: 18/373,448

(22) Filed: Sep. 27, 2023

(65) Prior Publication Data
US 2024/0100948 A1     Mar. 28, 2024

(30) Foreign Application Priority Data
Sep. 27, 2022    (KR) .......... 10-2022-0122631

(51) Int. Cl.
*B60K 35/00*     (2024.01)
*B60K 35/21*     (2024.01)

(52) U.S. Cl.
CPC .......... *B60K 35/21* (2024.01); *B60K 2360/34* (2024.01)

(58) Field of Classification Search
CPC ....... B60K 35/00; B60K 2360/34; B60Q 1/00
USPC .......................................................... 701/36
See application file for complete search history.

(56) References Cited

U.S. PATENT DOCUMENTS

| | | | |
|---|---|---|---|
| 2002/0079208 A1* | 6/2002 | Campana | H01H 13/023 200/310 |
| 2010/0067253 A1* | 3/2010 | Fehn | G02B 6/0091 362/602 |
| 2019/0275948 A1* | 9/2019 | Schnellbach | B60R 1/072 |
| 2022/0001827 A1* | 1/2022 | Kring | B60K 35/00 |
| 2022/0126689 A1* | 4/2022 | Jeon | H03K 17/955 |
| 2024/0426445 A1* | 12/2024 | Knoedler-Bunte | G09F 13/0481 |

FOREIGN PATENT DOCUMENTS

EP     3184348 A2 *   6/2017 ............. B60K 35/00

* cited by examiner

*Primary Examiner* — Tuan C To
(74) *Attorney, Agent, or Firm* — MORGAN, LEWIS & BOCKIUS LLP

(57) ABSTRACT

A vehicle lighting apparatus includes a symbol plate disposed inside a garnish, an actuator coupled to the symbol plate to move the symbol plate, and a housing which supports the symbol plate and the actuator, wherein the symbol plate may include a first symbol part and a second symbol part of which positions are changed by operation of the actuator.

15 Claims, 11 Drawing Sheets

VEHICLE LIGHTING APPARATUS

CROSS-REFERENCE TO RELATED APPLICATION

This application claims priority to and the benefit of Korean Patent Application No. 10-2022-0122631, filed on Sep. 27, 2022, the disclosure of which is incorporated herein by reference in its entirety.

BACKGROUND

1. Field of the Invention

The present invention relates to a vehicle lighting apparatus which illuminates a garnish installed in a vehicle.

2. Discussion of Related Art

Generally, many lighting apparatuses are installed in a vehicle to illuminate an interior. In recent years, a lighting apparatus, which illuminates a garnish to allow a desired symbol to be touched in order to operate or display a program (for example, music, video, call, temperature, or battery level) which a user wants, is provided according to an increase in demand for a seamless design.

Such a lighting apparatus operates in a manner in which the lighting apparatus does not illuminate a symbol when not used and illuminates the symbol to display the symbol on a garnish when used.

However, a plurality of symbols are disposed to implement a plurality of functions in a vehicle, and in this case, since a film on which the symbols are implemented is fixed to a garnish or a housing supporting the garnish, there is a problem that the conventional lighting apparatus cannot selectively illuminate the plurality of symbols.

SUMMARY OF THE INVENTION

The present invention is directed to providing a vehicle lighting apparatus which is improved to selectively illuminate a plurality of symbols.

According to an aspect of the present invention, there is provided a vehicle lighting apparatus which illuminates a garnish in a vehicle, the vehicle lighting apparatus including a symbol plate disposed inside a garnish, an actuator coupled to the symbol plate to move the symbol plate, and a housing which supports the symbol plate and the actuator, wherein the symbol plate includes a plurality of symbol parts moved by operation of the actuator so that the same region of the garnish is alternately illuminated with at least two or more shapes.

The plural symbol parts may include a first symbol part including a plurality of symbols disposed to be spaced apart from each other in a longitudinal direction of the symbol plate and a second symbol part which includes a plurality of symbols disposed to be spaced apart from each other in the longitudinal direction of the symbol plate and is formed in a different shape from the first symbol part.

The vehicle lighting apparatus may include a printed circuit board (PCB) including a light source and disposed to face the symbol plate, wherein at least one of the first symbol part and the second symbol part may be disposed at a position, at which light emitted from the light source passes through the at least one of the first symbol part and the second symbol part, by operation of the actuator.

The actuator may include a power generator which generates power and a variable part which changes a position of the symbol plate using the power generated by the power generator.

The symbol plate may include a first body which is disposed to face the light source and in which the first symbol part and the second symbol part are disposed and a coupling part disposed on an end portion of the first body and coupled to the variable part of the actuator.

The housing may include a first support part which movably supports the symbol plate and a second support part which protrudes from the first support part in a longitudinal direction of the first body of the symbol plate and supports the power generator of the actuator.

The first symbol part and the second symbol part may be disposed to be spaced apart from each other in a direction intersecting a longitudinal direction of the first body.

The power generator and the variable part may be disposed in a direction from the housing toward the symbol plate in order.

The symbol plate may include a second body disposed to face the light source, a third symbol part disposed in a longitudinal direction of the second body, and a fourth symbol part which is disposed in the second body and of which a position is changed by the variable part of the actuator.

The second body may include a first non-rotating part on which the third symbol part is disposed, a first hole formed in one side of the first non-rotating part, and a first rotating part disposed in the first hole and rotated with the variable part of the actuator.

The fourth symbol part may be provided as a plurality of fourth symbol parts disposed to be spaced apart from each other inside a side surface of the first rotating part along an edge of the first rotating part, and when the first rotating part is rotated, at least any one of the fourth symbol parts may be disposed side by side with the third symbol portion.

The second body may include a second non-rotating part on which the third symbol part is disposed, a second hole formed in one side of the second non-rotating part, a second rotating part which is disposed in the second hole and in which the fourth symbol part is disposed, and a gear part formed in a shape protruding from the second rotating part and coupled to the actuator.

An end portion of the variable part of the actuator may have a gear shape engaged with the gear part.

A third hole may be formed in the housing so that a part of the end portion of the variable part of the actuator passes through the third hole.

The symbol plate may include a third body disposed to face the light source, and the third body may include a third non-rotating part on which the third symbol part is disposed, a fourth hole formed in one side of the third non-rotating part and having a rectangular shape, and a third rotating part disposed in the fourth hole and rotated with the variable part of the actuator.

An end portion of the variable part of the actuator may be disposed in the fourth hole and formed in a gear shape engaged with the third rotating part to be engaged with the third rotating part.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a schematic view illustrating a vehicle lighting apparatus according to a first embodiment of the present invention.

DETAILED DESCRIPTION OF EXEMPLARY EMBODIMENTS

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination of a plurality of associated listed items.

When one element is referred to as being "connected" or "coupled" to the other element, it will be understood that the one element may be directly connected or coupled to the other element, or other elements may be present therebetween. In contrast, when an element is referred to as being "directly connected" or "directly coupled" to another element, it will be understood that there are no intervening elements.

In a description of the embodiment, in a case in which any one element is described as being formed "on or under" another element, such a description includes both a case in which the two elements are formed in direct contact with each other and a case in which the two elements are in indirect contact with each other with one or more other elements interposed between the two elements. In addition, when one element is described as being formed "on or under" the other element, such a description may include a case in which the one element is formed at an upper side or lower side with respect to the other element.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, components, and/or groups thereof but do not preclude the presence or addition of one or more other features, numbers, steps, operations, elements, components, and/or groups thereof.

Unless otherwise defined, all terms including technical and scientific terms used herein have meanings that are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, when embodiments are described in detail with reference to the accompanying drawings, components which are the same or correspond to each other will be denoted by the same or corresponding reference numerals in all drawings, and redundant descriptions will be omitted.

Figure 1:
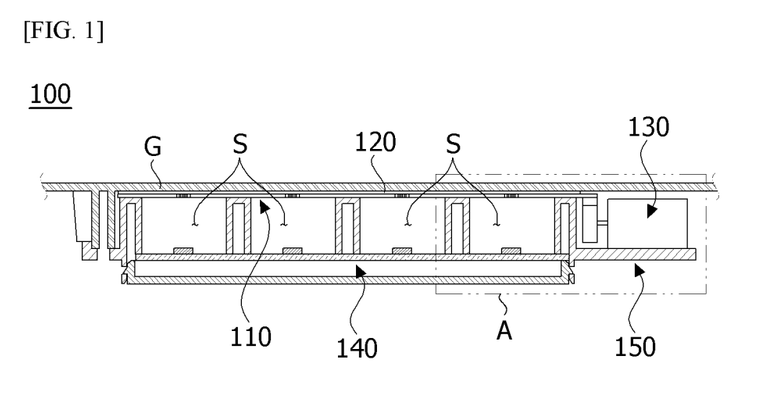
Figure 2:
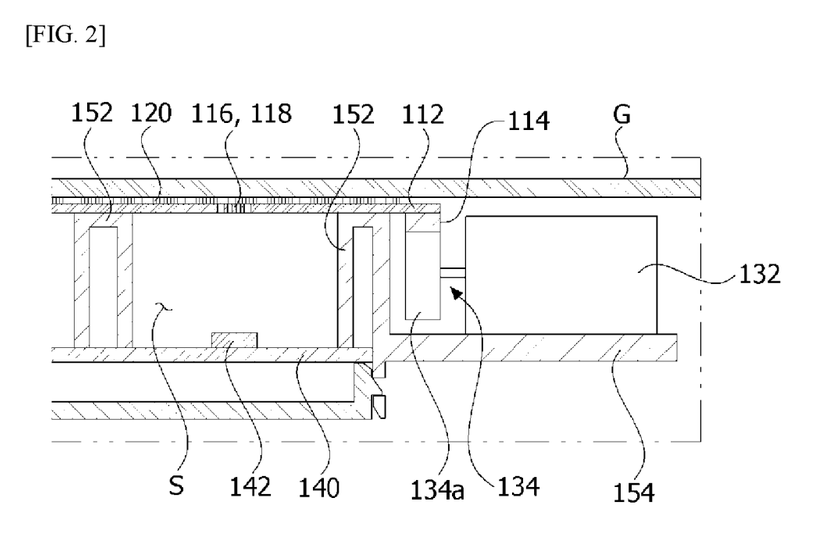
FIG. 2 is an enlarged view illustrating portion A of FIG. 1.
Figure 3:
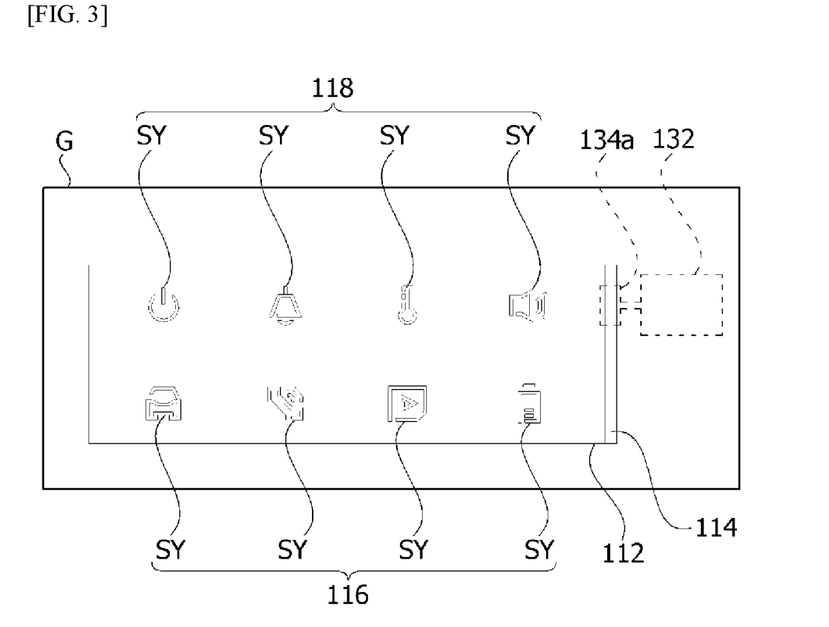
FIG. 3 is a plan view illustrating a garnish in a state in which light is not emitted from a light source.
Figure 4:
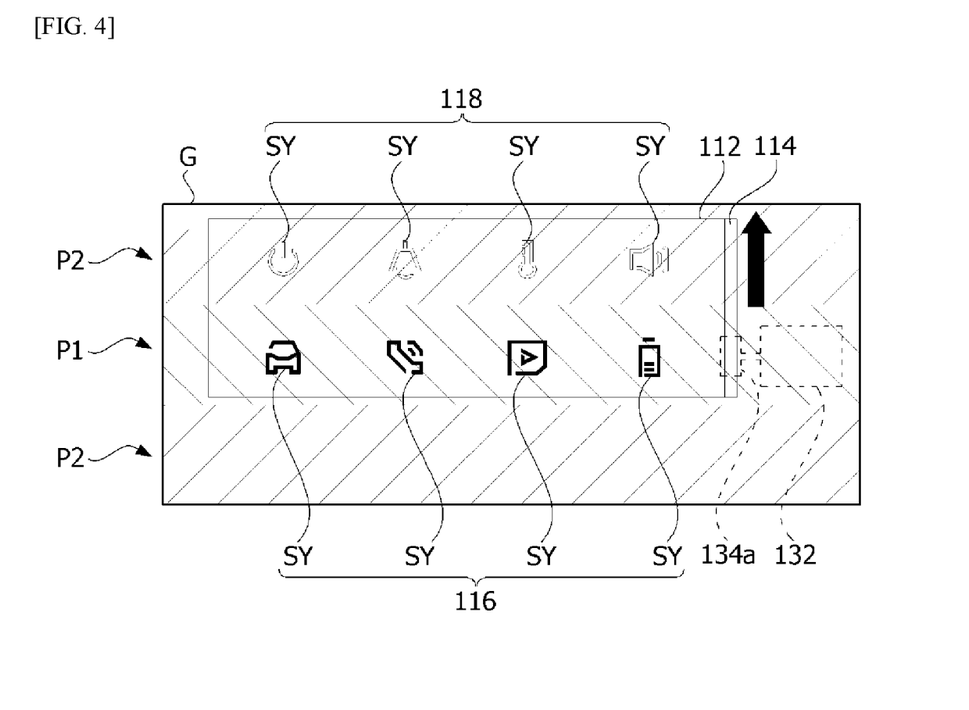
FIG. 4 is a view illustrating a state in which a first symbol part is illuminated.
Figure 5:
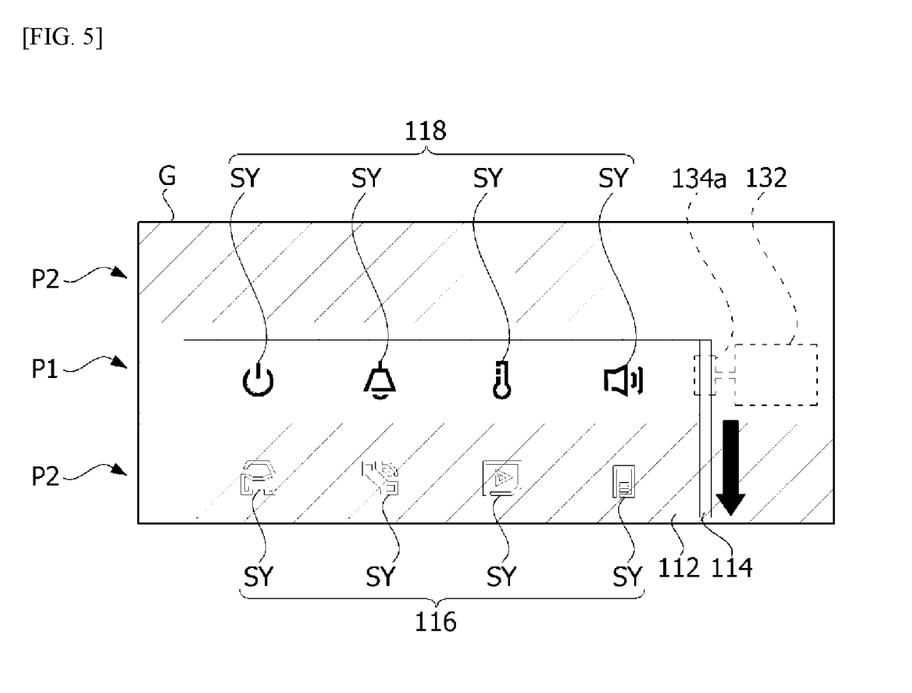
FIG. 5 is a view illustrating a state in which a second symbol part is illuminated.

FIG. 1 is a schematic view illustrating a vehicle lighting apparatus according to a first embodiment of the present invention, and FIG. 2 is an enlarged view illustrating portion A of FIG. 1. FIG. 3 is a plan view illustrating a garnish in a state in which light is not emitted from a light source, FIG. 4 is a view illustrating a state in which a first symbol part is illuminated, and FIG. 5 is a view illustrating a state in which a second symbol part is illuminated.

Referring to FIGS. 1 to 5, a vehicle lighting apparatus 100 according to the first embodiment of the present invention includes a symbol plate 110 disposed inside a garnish G, a touch film 120 disposed between the garnish G and the symbol plate 110, an actuator 130 which is coupled to the symbol plate 110 to move the symbol plate 110, a printed circuit board (PCB) 140 including a light source 142 and disposed to face the symbol plate 110, and a housing 150 which supports the symbol plate 110 and the actuator 130. The symbol plate 110 may include a plurality of symbol parts moved by operation of the actuator 130 so that the same region of the garnish G is alternately illuminated with at least two shapes.

The symbol plate 110 may be disposed between the light source 142 of the PCB 140 and the touch film 120. The symbol plate 110 may transmit light emitted from the light source 142.

The symbol plate 110 may include a first body 112, a coupling part 114, a first symbol part 116, and a second symbol part 118.

The first body 112 may be disposed to face the light source 142. The first body 112 may be formed in a rectangular shape in a longitudinal direction of the garnish G. The first body 112 may be movably supported by the housing 150.

The coupling part 114 may be disposed on an end portion of the first body 112. The coupling part 114 may be disposed on the end portion of the first body 112 in a direction intersecting a longitudinal direction of the first body 112. The coupling part 114 may protrude from the first body 112 toward the PCB 140. The coupling part 114 may be integrally formed with the first body 112 but is not limited thereto. The coupling part 114 may be provided as a separate component coupled to the first body 112. For example, the coupling part 114 may be provided as a block formed of a synthetic resin or metal material.

The coupling part 114 may be coupled to a variable part 134, which will be described below, of the actuator 130. In a state in which the coupling part 114 is coupled to the variable part 134 of the actuator 130, a position of the coupling part 114 may be changed by operation of the actuator 130. When the coupling part 114 is moved by the actuator 130, a position of the first body 112 coupled to the coupling part 114 may be changed.

The symbol plate 110 may include the plurality of symbol parts of which positions are changed by operation of the actuator 130.

The plurality of symbol parts may include a first symbol part 116 and a second symbol part 118.

The first symbol part 116 may be disposed in the first body 112. The first symbol part 116 may include a plurality of symbols SY disposed to be spaced apart from each other in the longitudinal direction of the first body 112. The plurality of symbols SY may be formed to pass through the first body 112. Accordingly, each symbol SY may be formed of a combination of a plurality of holes. In addition, the first symbol part 116 may be formed of the combination of symbols SY which have different shapes and are disposed side by side in the first body 112 in the longitudinal direction of the first body 112.

The second symbol part 118 may be disposed on the first body 112. The second symbol part 118 may include the plurality of symbols SY spaced apart from each other in the longitudinal direction of the first body 112. The plurality of symbols SY may be formed to pass through the first body 112. Accordingly, each symbol SY may be formed of the combination of the plurality of holes. In addition, the second symbol part 118 may be formed of a combination of symbols SY which have different shapes and are disposed side by side in the first body 112 in the longitudinal direction of the first body 112. Shapes of the symbols SY of the second symbol part 118 may be different from shapes of the symbols SY of the first symbol part 116.

The first symbol part 116 and the second symbol part 118 may be spaced apart from each other in a direction intersecting the longitudinal direction of the first body 112. Accordingly, when the position of the coupling part 114 is changed by movement of the variable part 134 of the actuator 130, the first symbol part 116 and the second symbol part 118 may be positioned at a first position P1 and a second position P2 by the first body 112 moved with the coupling part 114.

For example, as illustrated in FIG. 4, when the garnish G is viewed from above, as the first body 112 is moved toward one end portion of the garnish G with the coupling part 114 by operation of the actuator 130, the first symbol part 116 may be disposed at the first position P1 which is a central region of the garnish G. In this case, the second symbol part 118 may be disposed at the second position P2, which is a region at a side of an end portion of the garnish G in a direction intersecting the longitudinal direction of the garnish G.

Conversely, as illustrated in FIG. 5, when the garnish G is viewed from above, as the first body 112 is moved toward one end portion of the garnish G with the coupling part 114 by operation of the actuator 130, the second symbol part 118 may be disposed at the first position P1 which is the central region of the garnish G. In this case, the first symbol part 116 may be disposed at a second position P2, which is a region at a side of an end portion of the garnish G in a direction intersecting the longitudinal direction of the garnish G.

The vehicle lighting apparatus 100 according to one embodiment of the present invention may selectively change the positions of the first symbol part 116 and the second symbol part 118. Accordingly, since the vehicle lighting apparatus 100 may allow various symbols SY to be provided on one plate, a cost and time for preparing separate components for various symbols SY can be reduced.

The touch film 120 may be disposed between the garnish G and the symbol plate 110. The touch film 120 may be formed of a transparent material. Accordingly, light which is emitted from the light source 142 and passing through the first symbol part 116 or the second symbol part 118 may pass through the touch film 120 and illuminates the garnish G. A thickness of the touch film 120 may be smaller than or equal to a thickness of the first body 112 of the symbol plate 110. The touch film 120 may include an input device which is pressed by the garnish G when a user touches the garnish G, identifies a pressed position, and transmits the pressed position to a system.

The actuator 130 may be disposed on a side portion of the housing 150. The actuator 130 may be supported by the housing 150. The actuator 130 may be disposed in the longitudinal direction of the garnish G. As illustrated in FIG. 4 or 5, when the garnish G is viewed from above, the actuator 130 may be disposed at the first position P1 in the central region of the garnish G. Accordingly, the first symbol part 116 or the second symbol part 118 may be selectively moved to the first position P1 or the second position P2 by movement of the actuator 130.

The actuator 130 may include a power generator 132 which generates power and the variable part 134 which changes the position of the symbol plate 110 using the power generated by the power generator 132.

The variable part 134 may include a shaft which rotates and has a cylindrical shape and a transmission part 134*a* which is coupled to and moves with the shaft. In particular, the transmission part 134*a* is formed in a shape having a diameter greater than a diameter of the shaft and may be coupled to the coupling part 114 of the symbol plate 110. The transmission part 134*a* may be formed in a cylindrical shape but is not limited thereto.

The transmission part 134*a* may be moved by the power transmitted from the shaft to change the position of the coupling part 114 of the symbol plate 110.

For example, when the power generator 132 of the actuator 130 generates power, the transmission part 134*a* may be rotated clockwise. When the transmission part 134*a* is rotated clockwise, the coupling part 114 may move the first body 112 to one end portion of the garnish G in a direction intersecting the longitudinal direction of the garnish G. Accordingly, the first symbol part 116 may be disposed at the first position P1, and the second symbol part 118 may be disposed at the second position P2.

Conversely, when the transmission part 134*a* is rotated counterclockwise, the coupling part 114 may move the first body 112 to the other end portion of the garnish G in a direction intersecting the longitudinal direction of the garnish G. Accordingly, the first symbol part 116 may be disposed at the second position P2, and the second symbol part 118 may be disposed at the first position P1.

The PCB 140 may be formed of a combination of a board and the light source 142. The board of the PCB 140 may be formed in a rectangular shape in the longitudinal direction of the garnish G or the first body 112 of the symbol plate 110.

A plurality of light sources 142 may be provided to be spaced apart from each other in a longitudinal direction of the board. Each light source 142 may be disposed on the board corresponding to a position facing each symbol SY.

Referring to FIGS. 4 and 5, at least one of the first symbol part 116 and the second symbol part 118 may be disposed at a position, at which light emitted from the light source 142 passes through the at least one of the first symbol part 116 and the second symbol part 118, by operation of the actuator 130.

For example, as illustrated in FIG. 4, when the garnish G is viewed from above, as the first body 112 is moved toward one end portion of the garnish G with the coupling part 114 by operation of the actuator 130, the first symbol part 116 may be disposed at the first position P1 which is the central region of the garnish G. In this case, light emitted from the light source 142 may pass through the symbols SY of the first symbol part 116. The light passing through the symbols SY may pass through the touch film 120 and illuminates the garnish G according to shapes of the symbols SY.

Conversely, as illustrated in FIG. 5, when the garnish G is viewed from above, as the first body 112 is moved toward one end portion of the garnish G with the coupling part 114 by operation of the actuator 130, the second symbol part 118 may be disposed at the first position P1 which is the central region of the garnish G. In this case, light emitted from the light source 142 may pass through the symbols SY of the second symbol part 118. The light passing through the symbols SY may pass through the touch film 120 and illuminates the garnish G according to shapes of the symbols SY.

In the vehicle lighting apparatus 100 according to one embodiment of the present invention, since the garnish G may be selectively illuminated with various shapes as the positions of the first symbol part 116 and the second symbol part 118 may be changed, a system of the vehicle can be used according to convenience of the user. Accordingly, the vehicle lighting apparatus 100 can have an effect of improving the convenience of the user.

In addition, since the vehicle lighting apparatus 100 according to one embodiment of the present invention is designed so that the symbols SY at the first position P1 are illuminated and the symbols SY at the second position P2 are not illuminated, the symbols SY, which are not illuminated, are prevented from being displayed on the garnish G, and thus aesthetics cannot be reduced. Accordingly, degradation of design can be prevented.

The housing 150 may be disposed in the longitudinal direction of the garnish G. The housing 150 may include first support parts 152 and a second support part 154.

The first support parts 152 may movably support the symbol plate 110. The plurality of first support parts 152 may be disposed to be spaced apart from each other in the longitudinal direction of the garnish G. Accommodation spaces S, in which the symbols SY and the light sources 142 may be disposed, may be formed between the first support parts 152. Each of the first support parts 152 may be provided in a shape having a height in a direction from the PCB 140 toward the symbol plate 110. The first support part 152 may be supported by the board of the PCB 140.

The second support part 154 may be disposed on the first support part 152 disposed at an outermost side among the plurality of first support parts 152. The second support part 154 may protrude in the longitudinal direction of the first body 112 of the symbol plate 110 from an outer surface of the first support part 152. The second support part 154 may support the power generator 132 of the actuator 130.

Accordingly, a length of the second support part 154 may be greater than or equal to a total length of the actuator 130 of the second support part 154. Although not illustrated, the actuator 130 supported by the second support part 154 may be fixed to the second support part 154 using a coupling member such as a clamp.

Hereinafter, a vehicle lighting apparatus 200 according to a second embodiment of the present invention will be described. In the vehicle lighting apparatus 200 according to the second embodiment of the present invention, the same reference symbol will be used for the same component as the vehicle lighting apparatus 100 according to the first embodiment of the present invention, and the description thereof will be omitted.

Figure 6:
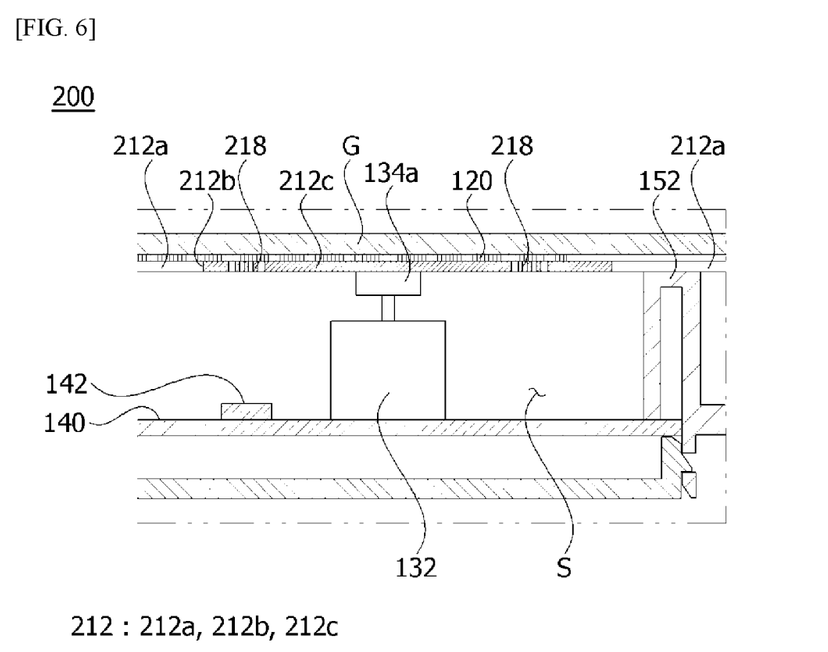
FIG. 6 is a schematic view illustrating a vehicle lighting apparatus according to a second embodiment of the present invention.
Figure 7:
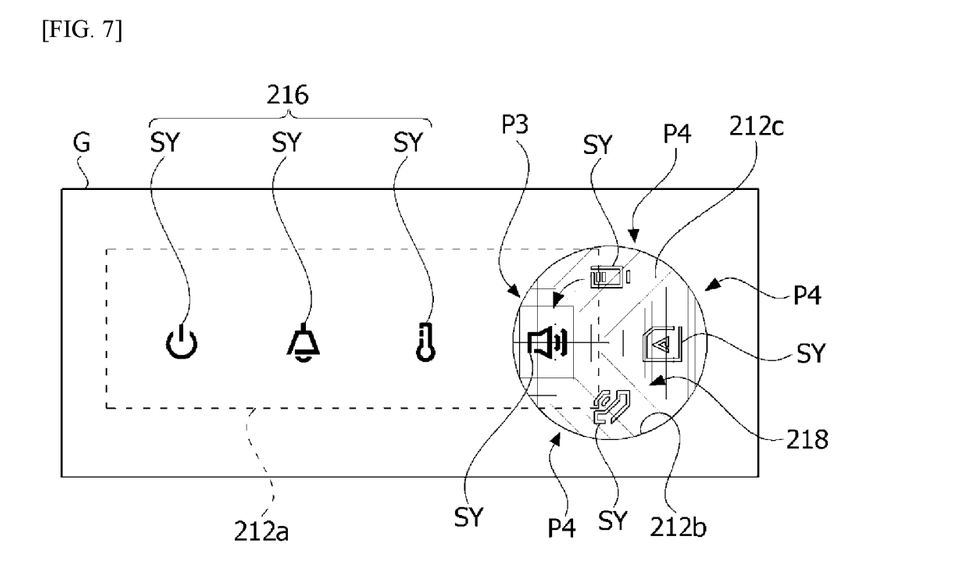
FIG. 7 is a view illustrating a state in which a third symbol part and a fourth symbol part are illuminated.

FIG. 6 is a schematic view illustrating a vehicle lighting apparatus according to the second embodiment of the present invention, and FIG. 7 is a view illustrating a state in which a third symbol part and a fourth symbol part are illuminated.

Referring to FIGS. 6 and 7, the vehicle lighting apparatus 200 according to the second embodiment of the present invention includes a second body 212, a first non-rotating part 212a, a first hole 212b, a first rotating part 212c, a third symbol part 216, and a fourth symbol part 218.

The second body 212 may support a touch film 120. The second body 212 may include the first non-rotating part 212a, the first hole 212b, and the first rotating part 212c.

The first non-rotating part 212a may be formed in a rectangular shape in a longitudinal direction of a garnish G. The third symbol part 216 may be disposed in the first non-rotating part 212a. The first non-rotating part 212a may be supported by first support parts 152 of a housing 150.

The first hole 212b may be formed at one side of the first non-rotating part 212a. The first hole 212b may be formed in a circular shape but is not limited thereto.

The first rotating part 212c may be disposed in the first hole 212b. The first rotating part 212c may be provided to have a size corresponding to an edge forming the first hole 212b. The fourth symbol part 218 may be disposed in the first rotating part 212c. The first rotating part 212c may be coupled to and supported by a variable part 134 of an actuator 130. The first rotating part 212c may be rotated with the variable part 134 of the actuator 130.

The third symbol part 216 may be disposed in the first non-rotating part 212a of the second body 212. In the third symbol part 216, three symbols SY may be disposed to be spaced a predetermined distance from each other in a longitudinal direction of the second body 212, but the present invention is not limited thereto. The third symbol part 216 may be formed to pass through the first non-rotating part 212a.

The fourth symbol part 218 may be disposed in the second body 212, and a position of the fourth symbol part 218 may be changed by the variable part 134 of the actuator 130. The fourth symbol part 218 may include a plurality of symbols SY disposed to be spaced apart from each other inside a side surface of the first rotating part 212c along an edge of the first rotating part 212c. The symbols SY may each be disposed at an interval of 90° around a center of the first rotating part 212c along the edge of the first rotating part 212c, but the present invention is not limited thereto.

A distance between a symbol SY of the third symbol part 216 disposed in a central portion of the garnish G and a symbol SY of the fourth symbol part 218 adjacent to the symbol SY of the third symbol part 216 may correspond to a distance between the symbols SY of the third symbol part 216. In addition, at least any one symbol SY of the fourth symbol part 218 may be disposed side by side with the symbol SY of the third symbol part 216. Accordingly, even when the first rotating part 212c is rotated and the fourth symbol part 218 is rotated, a constant distance between the symbol SY of the third symbol part 216 and the symbol SY of the adjacent fourth symbol part 218 may be maintained. Accordingly, characteristics of design are not degraded, and aesthetics can be maintained.

The actuator 130 may be disposed in an accommodation space S formed between the first support parts 152 of the housing 150. More specifically, the actuator 130 may be disposed in the accommodation space S formed at an outermost side among a plurality of accommodation spaces S. That is, the actuator 130 may be disposed inside the housing 150.

In a state in which a power generator 132 supported by the board of the PCB 140, the power generator 132 and an accommodation portion may be disposed in a direction from the PCB 140 toward a symbol plate 110. Accordingly, the variable part 134 of the actuator 130 may support the first rotating part 212c of the second body 212 of the symbol plate 110. When power is generated by the power generator 132, the variable part 134 is rotated, and the first rotating part 212c may be rotated according to the rotation of the variable part 134. When the first rotating part 212c is rotated, positions of the symbols SY of the fourth symbol part 218 may be changed so that light may pass through any one symbol SY among the symbols SY of the fourth symbol part 218.

The symbols SY of the fourth symbol part 218 may be disposed at a third position P3 and a fourth position P4 by the actuator 130.

For example, when the actuator 130 operates to rotate the first rotating part 212c, any one of the symbols SY of the fourth symbol part 218 facing the symbol SY of the third symbol part 216 may be disposed at the third position P3 at which light emitted from the light source 142 of the PCB 140 may pass through the symbol SY. In this case, the remaining symbols SY of the fourth symbol part 218 may be disposed at the fourth position P4. The symbols SY disposed at the fourth position P4 may not be disposed at positions facing the light source 142.

In the vehicle lighting apparatus 200 according to the second embodiment of the present invention, the plurality of symbols SY may be provided on one plate through a combination of fixed symbols SY and symbols SY of which positions are changed. Accordingly, a cost and time for preparing separate parts to implement the plurality of symbols SY can be reduced.

In addition, since the vehicle lighting apparatus 200 according to the second embodiment of the present invention does not have a separate support component to support the actuator 130, a cost and time for preparing the separate component to support the actuator 130 can be reduced.

Hereinafter, a vehicle lighting apparatus 300 according to a third embodiment of the present invention will be described. In the vehicle lighting apparatus 300 according to the third embodiment of the present invention, the same reference symbol will be used for the same component as the vehicle lighting apparatus 200 according to the second embodiment of the present invention, and the description thereof will be omitted.

Figure 8:
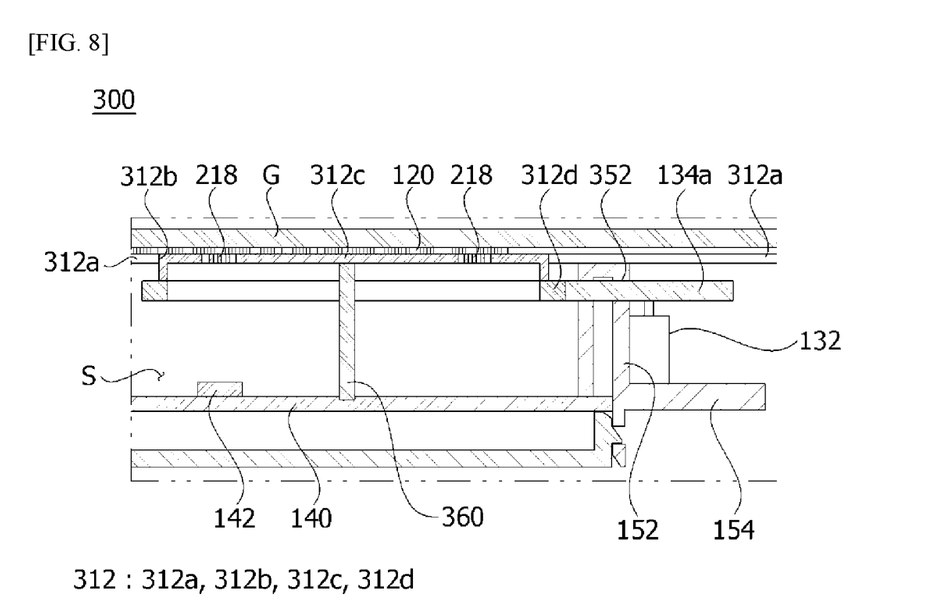
FIG. 8 is a schematic view illustrating a vehicle lighting apparatus according to a third embodiment of the present invention.
Figure 9:
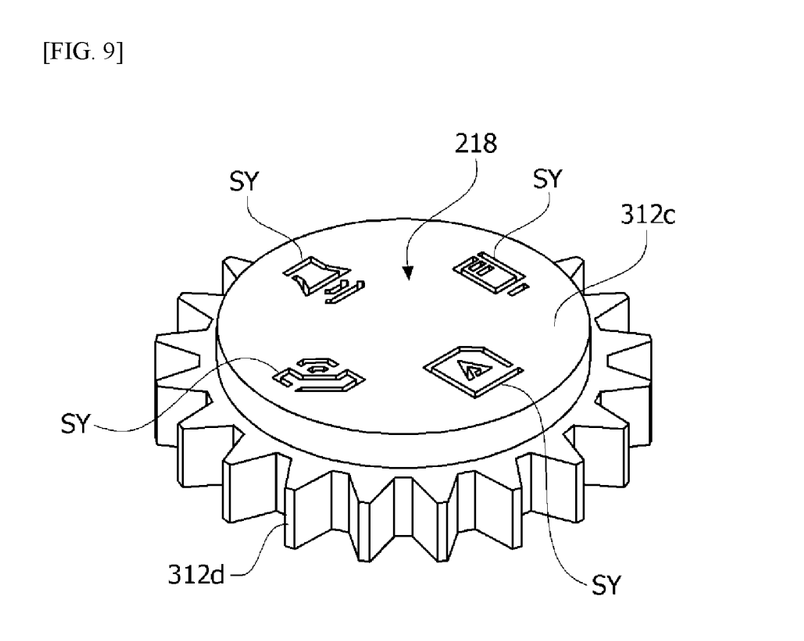
FIG. 9 is a perspective view illustrating a second rotating part and a gear part.

FIG. 8 is a schematic view illustrating a vehicle lighting apparatus according to the third embodiment of the present invention, and FIG. 9 is a perspective view illustrating a second rotating part and a gear part.

Referring to FIGS. 8 and 9, the vehicle lighting apparatus 300 according to the third embodiment of the present invention includes a third body 312, a second non-rotating part 312a, a second hole 312b, a second rotating part 312c, a gear part 312d, a third hole 352, and a shaft 360.

The third body 312 may support a touch film 120. The third body may include the second non-rotating part 312a, the second hole 312b, the second rotating part 312c, and the gear part 312d.

The second non-rotating part 312a may be formed in a rectangular shape in a longitudinal direction of a garnish G. A third symbol part 216 may be disposed in the second non-rotating part 312a. The second non-rotating part 312a may be supported by first support parts 152 of a housing 150.

The second hole 312b may be formed at one side of the second non-rotating part 312a. The second hole 312b may be formed in a circular shape but is not limited thereto.

The second rotating part 312c may be disposed in the second hole 312b. The second rotating part 312c may have a shape corresponding to an edge shape forming the second hole 312b. A fourth symbol part 218 may be disposed in the second rotating part 312c. The second rotating part 312c may be rotated with the gear part 312d. The second rotating part 312c may be formed in a hollow shape to accommodate an end portion of the shaft 360.

The gear part 312d may be disposed in an accommodation space S formed between the first support parts 152 of the housing 150. The gear part 312d may be formed in a shape protruding from the second rotating part 312c and coupled to an actuator 130. The gear part 312d may be provided at one side (for example, a lower side) of the second rotating part 312c. The gear part 312d may be integrally formed with the second rotating part 312c but is not limited thereto. The gear part 312d may be provided as a separate component to be coupled to the second rotating part 312c. The gear part 312d may be formed in a hollow shape to accommodate an end portion of the shaft 360. An outer surface of the gear part 312d may be formed in a gear shape in which concave portions and convex portions are alternately formed. The gear part 312d may be formed in a shape having a diameter greater than a diameter of the second rotating part 312c.

The third hole 352 may be formed in the first support part 152 of the housing 150. The third hole 352 may be formed in a region of the first support part 152 adjacent to a symbol plate 110. The third hole 352 may accommodate a part of an end portion of a variable part 134 of the actuator 130, or the end portion of the variable part 134 of the actuator 130 may pass through the third hole 352.

The shaft 360 may be disposed in the accommodation space S formed between the first support parts 152 of the housing 150. The shaft 360 may be formed in a cylindrical shape but is not limited thereto. One end of the shaft 360 may be supported by the board of the PCB 140, and the other end thereof may rotatably support the second rotating part 312c. A height of the shaft 360 may correspond to a height from one surface of the board of the PCB 140 to an inner surface of the second rotating part 312c but is not limited thereto.

An end portion (outer surface) of a transmission part 134a of the variable part 134 of the actuator 130 may be formed in a gear shape engaged with the gear part 312d. Accordingly, the transmission part 134a may be engaged with the gear part 312d and rotated by power generated by a power generator 132 to transmit a rotational force to the gear part 312d. The gear part 312d which receives the rotational force may be rotated, and the second rotating part 312c connected to the gear part 312d may also be rotated with the gear part 312d.

In the vehicle lighting apparatus 300 according to the third embodiment of the present invention, positions of a plurality of symbols SY may be stably changed through an engaging gear structure. Accordingly, stability of use can be secured.

Hereinafter, a vehicle lighting apparatus 400 according to a fourth embodiment of the present invention will be described. In the vehicle lighting apparatus 400 according to the fourth embodiment of the present invention, the same reference symbol will be used for the same component as the vehicle lighting apparatus 300 according to the third embodiment of the present invention, and the description thereof will be omitted.

Figure 10:
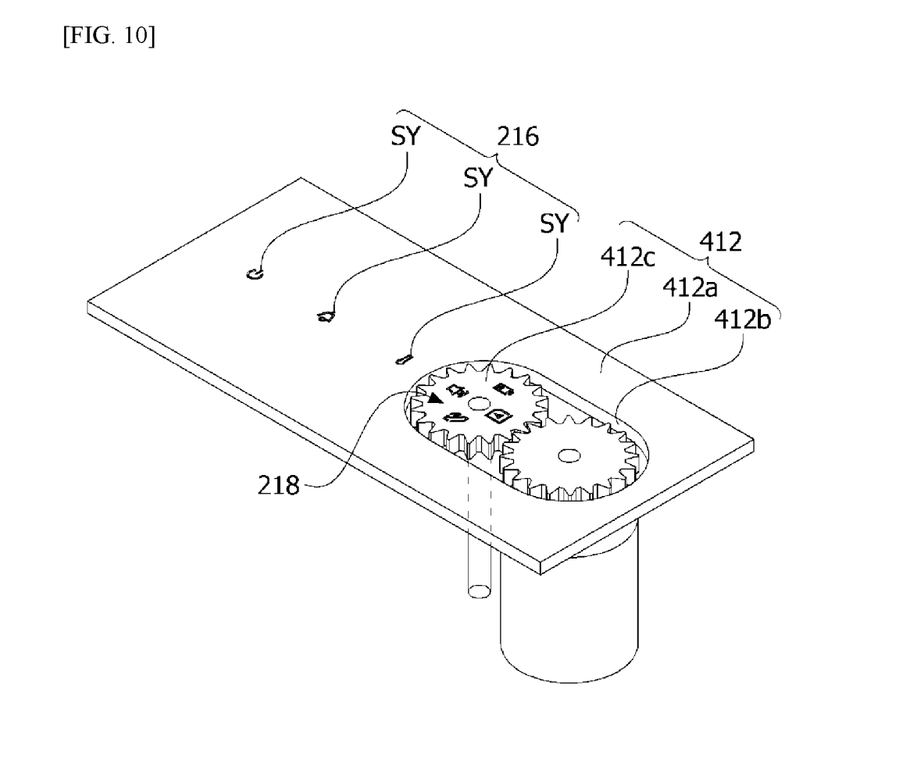
FIG. 10 is a perspective view illustrating a symbol plate, an actuator, and a shaft according to a fourth embodiment of the present invention.
Figure 11:
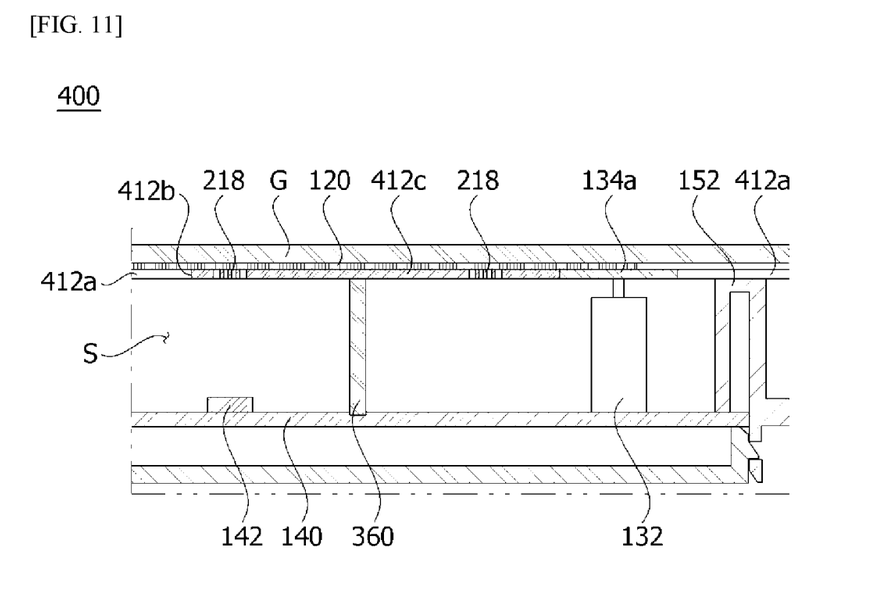
FIG. 11 is a schematic view illustrating a vehicle lighting apparatus according to the fourth embodiment of the present invention.

FIG. 10 is a perspective view illustrating a symbol plate, an actuator, and a shaft according to the fourth embodiment of the present invention, and FIG. 11 is a schematic view illustrating a vehicle lighting apparatus according to the fourth embodiment of the present invention.

Referring to FIGS. 10 and 11, the vehicle lighting apparatus 400 according to the fourth embodiment of the present invention may include a fourth body 412, a third non-rotating part 412a, a fourth hole 412b, and a third rotating part 412c.

The fourth body 412 may support a touch film 120. The fourth body 412 may include the third non-rotating part 412a, the fourth hole 412b, and the third rotating part 412c.

Since the third non-rotating part 412a is the same as the second non-rotating part 312a of the vehicle lighting apparatus 300 according to the third embodiment of the present invention, the description thereof will be omitted.

The fourth hole 412b may be formed at one side of the third non-rotating part 412a. The fourth hole 412b may be formed in a rectangular shape in a longitudinal direction of the third non-rotating part 412a. A size of the fourth hole 412b may be greater than a size of the third rotating part 412c and a size of a variable part 134 of an actuator 130. Accordingly, the third rotating part 412c and the variable part 134 of the actuator 130 may be prevented from colliding with a wall surface forming the fourth hole 412b, and thus operational safety of the third rotating part 412c and the actuator 130 can be maintained.

The third rotating part 412c may be disposed in the fourth hole 412b. An edge portion of the third rotating part 412c may be formed in a gear shape. Accordingly, the third rotating part 412c may be engaged with an end portion of the variable part 134 of the actuator 130.

Although not illustrated in the drawings, the third rotating part 412c may be in contact with the touch film 120. Accordingly, when the third rotating part 412c is rotated, the touch film 120 may be damaged. To prevent this, a protrusion protruding from the fourth body 412 toward the touch film 120 may be provided at a corner side of the fourth body 412. Damage to the touch film 120 due to the rotation of the third rotating part 412c can be prevented due to the protrusion.

The actuator 130 may be disposed in an accommodation space S. A transmission part 134a of the variable part 134 of the actuator 130 may be disposed in the fourth hole 412b. The transmission part 134a may be engaged with the third rotating part 412c in a state in which the transmission part 134a is disposed in the fourth hole 412b. The transmission part 134a may be rotated by power generated by a power generator 132 to transmit a rotational force to the third rotating part 412c. When the third rotating part 412c which receives the rotational force is rotated, positions of symbols SY of the fourth symbol part 218 may be changed.

In the vehicle lighting apparatus 100 according to the fourth embodiment of the present invention, the positions of the plurality of symbols SY can be stably changed using an engaging gear structure. Accordingly, since a range in which a user may select a desired program can be widened, use convenience can be improved.

According to one embodiment of the present invention, since a plurality of symbols can be selectively illuminated, use convenience of a user can be improved.

While the present invention has been described above with reference to exemplary embodiments, it may be understood by those skilled in the art that various modifications and changes of the present invention may be formed within a range not departing from the spirit and scope of the present invention defined by the appended claims. In addition, it should be interpreted that differences related to the modifications and changes fall within the scope of the present invention defined by the appended claims.

What is claimed is:

1. A vehicle lighting apparatus which illuminates a garnish in a vehicle, the vehicle lighting apparatus comprising:
a symbol plate disposed inside the garnish;
an actuator coupled to the symbol plate to move the symbol plate, wherein the actuator includes:
a power generator configured to generate power; and
a variable part configured to change a position of the symbol plate using the power generated by the power generator; and
a housing which supports the symbol plate and the actuator,
wherein the symbol plate includes a plurality of symbol parts moved by operation of the actuator so that the same region of the garnish is alternately illuminated with at least two or more shapes.

2. The vehicle lighting apparatus of claim 1, wherein the plural of symbol parts include:
a first symbol part including a plurality of symbols disposed to be spaced apart from each other in a longitudinal direction of the symbol plate; and
a second symbol part which includes a plurality of symbols disposed to be spaced apart from each other in the longitudinal direction of the symbol plate and is formed in a different shape from the first symbol part.

3. The vehicle lighting apparatus of claim 2, comprising:
a printed circuit board (PCB) including a light source and disposed to face the symbol plate,
wherein at least one of the first symbol part and the second symbol part is disposed at a position, at which light emitted from the light source passes through the at least one of the first symbol part and the second symbol part, by operation of the actuator.

4. The vehicle lighting apparatus of claim 3, wherein the symbol plate includes:
a first body which is disposed to face the light source and in which the first symbol part and the second symbol part are disposed; and
a coupling part disposed on an end portion of the first body and coupled to the variable part of the actuator.

5. The vehicle lighting apparatus of claim 4, wherein the housing includes:
a first support part which movably supports the symbol plate; and a second support part which protrudes from the first support part in a longitudinal direction of the first body of the symbol plate and supports the power generator of the actuator.

6. The vehicle lighting apparatus of claim 4, wherein the first symbol part and the second symbol part are disposed to be spaced apart from each other in a direction intersecting a longitudinal direction of the first body.

7. The vehicle lighting apparatus of claim 1, wherein the power generator and the variable part are disposed in a direction from the housing toward the symbol plate in order.

8. The vehicle lighting apparatus of claim 4, wherein the symbol plate includes:
    a second body disposed to face the light source;
    a third symbol part disposed in a longitudinal direction of the second body; and
    a fourth symbol part which is disposed in the second body and of which a position is changed by the variable part of the actuator.

9. The vehicle lighting apparatus of claim 8, wherein the second body includes:
    a first non-rotating part on which the third symbol part is disposed;
    a first hole formed in one side of the first non-rotating part; and
    a first rotating part disposed in the first hole and rotated with the variable part of the actuator.

10. The vehicle lighting apparatus of claim 9, wherein:
    the fourth symbol part is provided as a plurality of fourth symbol parts disposed to be spaced apart from each other inside a side surface of the first rotating part along an edge of the first rotating part; and
    when the first rotating part is rotated, at least any one of the fourth symbol parts is disposed side by side with the third symbol part.

11. The vehicle lighting apparatus of claim 9, wherein the second body includes:
    a second non-rotating part on which the third symbol part is disposed;
    a second hole formed in one side of the second non-rotating part;
    a second rotating part which is disposed in the second hole and in which the fourth symbol part is disposed; and
    a gear part formed in a shape protruding from the second rotating part and coupled to the actuator.

12. The vehicle lighting apparatus of claim 11, wherein an end portion of the variable part of the actuator has a gear shape engaged with the gear part.

13. The vehicle lighting apparatus of claim 12, wherein a third hole is formed in the housing so that a part of the end portion of the variable part of the actuator passes through the third hole.

14. The vehicle lighting apparatus of claim 11, wherein:
    the symbol plate includes a third body disposed to face the light source; and
    the third body includes a third non-rotating part on which the third symbol part is disposed, a fourth hole formed in one side of the third non-rotating part and having a rectangular shape, and a third rotating part disposed in the fourth hole and rotated with the variable part of the actuator.

15. The vehicle lighting apparatus of claim 14, wherein an end portion of the variable part of the actuator is disposed in the fourth hole and formed in a gear shape engaged with the third rotating part to be engaged with the third rotating part.

* * * * *